United States Patent
Sprainis et al.

(10) Patent No.: US 8,465,009 B2
(45) Date of Patent: Jun. 18, 2013

(54) ELASTOMERIC PAD FOR A COMPRESSIBLE ELASTOMERIC SPRING

(75) Inventors: Ronald J. Sprainis, Springfield, OR (US); Michael E. Ring, Saint John, IN (US); Bradley Anderson, Des Plaines, IL (US); Jonathon Marlow, Hobart, IN (US)

(73) Assignee: WABTEC Holding Corp., Wilmerding, PA (US)

( * ) Notice: Subject to any disclaimer, the term of this patent is extended or adjusted under 35 U.S.C. 154(b) by 716 days.

(21) Appl. No.: 12/150,928

(22) Filed: May 1, 2008

(65) Prior Publication Data

US 2008/0272080 A1 Nov. 6, 2008

Related U.S. Application Data (60) Provisional application No. 60/926,987, filed on May 1, 2007.

(51) Int. Cl.
*B60G 11/22* (2006.01)
(52) U.S. Cl.
USPC ........... 267/292; 267/140; 267/141; 267/145; 267/153
(58) Field of Classification Search
USPC .............. 267/140, 141, 141.1, 143, 145, 153, 267/292, 294; 213/22, 26, 7, 32 A, 40 R, 213/44, 220; 248/615, 621, 632, 633
See application file for complete search history.

(56) References Cited

U.S. PATENT DOCUMENTS

| | | | | |
|---|---|---|---|---|
| 1,772,414 A * | 8/1930 | Brooke-Hunt et al. | ........ | 267/293 |
| 2,486,741 A * | 11/1949 | Gabriel | ........................ | 267/293 |
| 2,553,635 A | 5/1951 | Dath | | |
| 2,553,636 A | 5/1951 | Dath | | |
| 2,726,080 A | 12/1955 | Withall | | |
| 2,982,536 A * | 5/1961 | Kordes | ........................ | 267/153 |
| 3,311,331 A | 3/1967 | Steimen | | |
| 3,556,503 A * | 1/1971 | van Moss, Jr. | .................... | 276/3 |
| 3,602,465 A * | 8/1971 | Velut | .............................. | 248/616 |
| 3,677,535 A * | 7/1972 | Beck | ............................. | 267/294 |
| 3,684,271 A * | 8/1972 | Arthur | ........................ | 267/152 |
| 3,929,729 A * | 12/1975 | Chung | ......................... | 267/138 |
| 3,984,125 A * | 10/1976 | Paton et al. | ............ | 280/124.177 |
| 4,198,037 A | 4/1980 | Anderson | | |

(Continued)

FOREIGN PATENT DOCUMENTS

| | | |
|---|---|---|
| DE | 2944669 | 5/1981 |
| GB | 640838 | 7/1950 |
| GB | 752962 | 7/1956 |

*Primary Examiner* — Robert A Siconolfi
*Assistant Examiner* — Mariano Sy
(74) *Attorney, Agent, or Firm* — James Ray & Assoc (57) ABSTRACT

A compressible resilient elastomeric pad includes a body defining a central axis, the body formed from a predetermined material and having each of a peripheral side surface, a first axial end and a second axial end, each of the first and second axial ends having a flat surface thereof disposed normal to such central axis. A first raised projection is centrally formed on the flat surface of the first axial end and a second raised projection is centrally formed on the flat surface of the second axial end. A first groove is formed in the flat surface of the first axial end in abutting relationship with a peripheral side surface of the first projection and a second groove is formed in the flat surface of the second axial end in abutting relationship with a peripheral side surface of the second projection.

19 Claims, 6 Drawing Sheets

U.S. PATENT DOCUMENTS

| | | | | |
|---|---|---|---|---|
| 4,591,059 | A | * | 5/1986 | Hammarlund ............ 213/32 R |
| 4,997,171 | A | * | 3/1991 | Toms, Jr. ................... 267/294 |
| 5,014,967 | A | * | 5/1991 | Wolf et al. ................. 267/153 |
| 5,104,101 | A | * | 4/1992 | Anderson et al. ........... 267/219 |
| 5,335,403 | A | * | 8/1994 | Jensen ..................... 29/896.91 |
| 5,351,844 | A | | 10/1994 | Carlstedt |
| 5,431,260 | A | * | 7/1995 | Gross et al. ............. 188/321.11 |
| 6,478,173 | B2 | * | 11/2002 | Carlstedt ................... 213/32 C |
| 6,520,360 | B1 | * | 2/2003 | Withall et al. ................ 213/220 |
| D524,338 | S | * | 7/2006 | Sims ........................... D15/199 |
| 2008/0284077 | A1 | * | 11/2008 | Sprainis et al. ............ 267/141.1 |

* cited by examiner

ELASTOMERIC PAD FOR A COMPRESSIBLE ELASTOMERIC SPRING

CROSS-REFERENCE TO RELATED APPLICATIONS

This application is related to and claims priority from Provisional Patent Application Ser. No. 60/926,987 filed on May 1, 2007. This application is further closely related to co-pending U.S. Ser. No. 12/150,809 entitled "Compressible Elastomeric Spring", to co-pending U.S. Ser. No. 12/150,926 entitled "Plate for A compressible Elastomeric Spring", to co-pending U.S. Ser. No. 12/150,929 entitled "Method of Making Compressible Elastomeric Spring", to co-pending U.S. Ser. No. 12/150,925 entitled "Method Of Making Elastomeric Pad For A Compressible Elastomeric Spring", to co-pending U.S. Ser. No. 12/150,777 entitled "Combination Yoke and Elastomeric Draft Gear", to co-pending U.S. Ser. No. 12/150,808 entitled "Combination Yoke and Elastomeric Draft Gear Having A Friction Mechanism", and to co-pending U.S. Ser. No. 12/150,927 entitled "Elastomeric Draft Gear Having A Housing", filed concurrently herewith. These applications are being assigned to the assignee of the present invention and the disclosures of these co-pending applications are hereby incorporated by reference thereto.

FIELD OF THE INVENTION

The present invention relates, in general, to compressible elastomeric springs and, more particularly, this invention relates to a compressible elastomeric pad employable in the elastomeric compressible spring for absorbing energy and, yet more particularly, the instant invention related to a compressible elastomeric pad for the elastomeric compressible spring employed within the draft gear assembly for cushioning buff and draft dynamic impact forces that are usually encountered in operation of a railway vehicle.

BACKGROUND OF THE INVENTION

As is generally well known, compressible elastomeric springs employing elastomeric pads and metal plates have been used extensively in various applications for absorbing energy. As is also well known, the absorbing capacity of such compressible elastomeric springs is affected by the design of elastomeric pads and, more particularly, by material selection, by the forming process and by mechanical attachment of the elastomeric pad to the plate. Several alternative pad designs are illustrated in U.S. Pat. No. 5,351,844 issued to Carlstedt and U.S. Pat. No. 4,198,037 issued to Anderson. Carlstedt provides for a pad manufactured from a copolyester polymer material and having a central projection extending from each end thereof which is mechanically interlocked with an aperture formed in the metal plate. Anderson provides a pad also manufactured from the copolyester material and having a central protrusion on one end and a central socket on an opposed end which interlock with a socket and a protrusion on the metal plate respectively.

However, there is a continuing need for an improved compressible elastomeric pad so as to enable the spring to absorb and cushion higher energy.

SUMMARY OF THE INVENTION

The invention provides a compressible resilient elastomeric pad. The pad includes a body defining a central axis of the pad. The body is formed form a predetermined material and has each of a peripheral side surface, a first axial end and a second axial end. Each of the first and second axial ends has a flat surface thereof disposed normal to the central axis. In accordance with one aspect of the invention, the pad includes a groove centrally formed in the flat surface of one of the first and second axial ends, the groove having a predetermined shape.

In accordance with another aspect of the invention, the pad includes a plurality of pockets formed in the flat surface of at least one of the first and second axial ends.

In accordance with another aspect of the invention, the pad includes a first raised projection which is centrally formed on the flat surface of the first axial end and a second raised projection which is centrally formed on the flat surface of the second axial end. A first groove is formed in the flat surface of the first axial end in abutting relationship with a peripheral side surface of the first projection and a second groove is formed in the flat surface of the second axial end in abutting relationship with a peripheral side surface of the second projection.

The present invention also provides an improvement of the presently employed compressible elastomeric pad capable of absorbing and dissipating energy applied thereto. An improvement includes the pad manufactured from a predetermined material being modified to orient a molecular structure during a forming process and having a predetermined shape factor achieved during the forming process to enable repetitive absorption and dissipation of the energy in excess of about one hundred thirty percent (130%) of an ultimate tensile strength of the predetermined material.

OBJECTS OF THE INVENTION

It is, therefore, one of the primary objects of the present invention to provide an elastomeric pad for a compressible elastomeric spring.

Another object of the present invention is to provide an elastomeric pad manufactured from a modified copolyester polymer material having an oriented molecular structure and shape factor enabling the pad to absorb and dissipate dynamic impact loads in excess of one hundred thirty percent (130%) of an ultimate tensile strength of such copolyester polymer material.

Yet another object of the present invention is to provide an elastomeric pad having a projection extending from each axial end and a groove formed in abutting relationship with the peripheral side surface of the projection.

A further object of the present invention is to provide an elastomeric pad having a projection extending from each axial end and a plurality of apertures formed in abutting relationship with the peripheral side surface of the projection.

Yet a further object of the present invention is to provide an elastomeric pad having a groove formed in at least one axial end thereof.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Prior to proceeding to the more detailed description of the present invention, it should be noted that, for the sake of clarity and understanding, identical components which have identical functions have been identified with identical reference numerals throughout the several views illustrated in the drawing figures.

The best mode for carrying out the invention is presented in terms of its various embodiments, herein depicted within FIGS. 1 through 8. However, the invention is not limited to the described embodiments, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only several particular configurations shall be shown and described for purposes of clarity and disclosure and not by way of limitation of scope.

Figure 10:
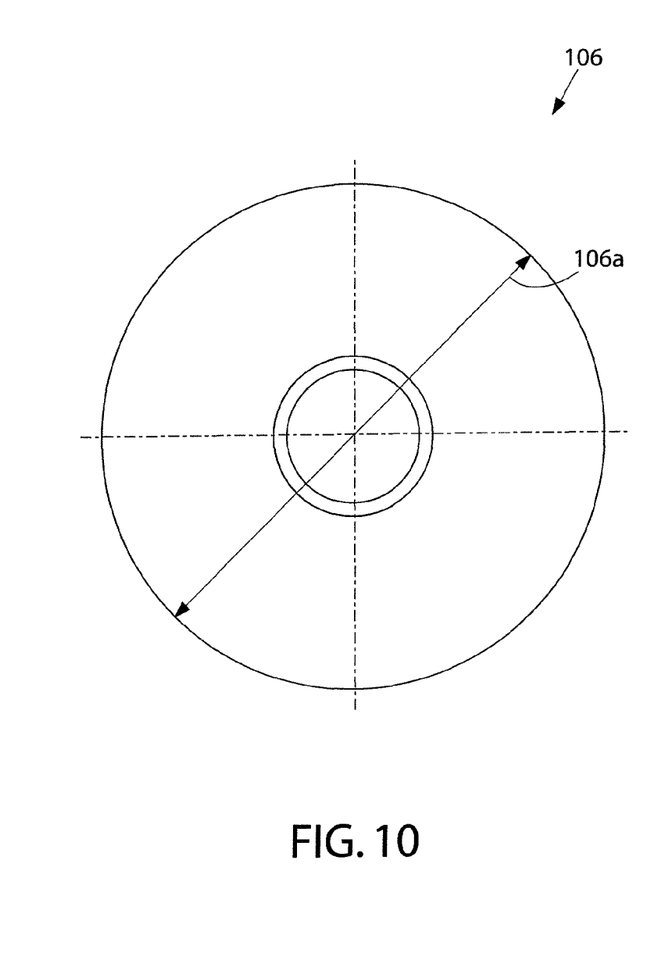
FIG. 10 is a planar view of the preform employed in manufacturing of the compressible elastomeric pad of FIGS. 1-8.

The present invention provides a compressible elastomeric pad, generally designated as 110. The pad 110 is manufactured from a preform, generally designated as 106, as disclosed in the co-pending U.S. Ser. No. 12/150,925 entitled "Method Of Making Elastomeric Pad For A Compressible Elastomeric Spring" filed concurrently herewith.

The pad 110 has a body 111 defining a central axis 112. In the presently preferred embodiment of the invention, the body 111 has a circular cross-section disposed normal to the central axis 112, although other cross-sectional shapes, for example such as a rectangle, is contemplate for use in the present invention. A first axial end 114 is disposed on the body 111 and has a flat, preferably substantially, surface 118 disposed normal to the central axis 112. An axially opposed second end 116 is also disposed on the body 111 and has a flat, preferably substantially, surface 120 disposed normal to the central axis 112. The body 111 also has a peripheral side surface 122. The peripheral side surface 122 has an outwardly extending curved shape which is achieved during forming process of the pad. Each of the axial ends 114, 116 has a predetermined diameter.

In accordance with one embodiment of the invention, the pad 110 improvement energy absorption and dissipation of the existing elastomeric pads disclosed in U.S. Pat. Nos. 5,351,844 and 4,198,037, whose teachings are incorporated into this document by reference thereto. Both U.S. Pat. Nos. 5,351,844 and 4,198,037 disclose elastomeric springs for use railway vehicle's draft gears.

Such pad 110 is manufactured from a thermoplastic elastomer material that has been modified prior to making the preform 106. The pad 110 also has its molecular structure oriented above 70% during the forming process and a predetermined shape factor achieved after the forming process enabling repetitive absorption and dissipation of dynamic impact loads in excess of one hundred thirty percent (130%) of ultimate tensile strength of such copolyester polymer material without the use of the friction cutch mechanism. The presently preferred original or virgin thermoplastic elastomer material prior to being modified is a copolyester polymer material manufactured by E.I. DuPont de Nemours & Co. of Wilmington, Del. under the general HYTREL trademark and, more specifically, under the Hytrel 5556 brand. Such virgin Hytrel 5556 material is characterized by an ultimate tensile strength of about 5,800 pounds per square inch (PSI). As has been discovered, the modified material in combination with a forming process disclosed in the co-pending U.S. Ser. No. 12/150,925 entitled "Method Of Making Elastomeric Pad For A Compressible Elastomeric Spring" and a shape factor of about 3.30 is capable of repetitive absorption and dissipation of dynamic impact loads greater than 7,500 PSI when the pad 110 is installed into the spring 100 in accordance with the disclosure of the above-referenced co-pending U.S. Ser. No. 12/150,809 entitled "Compressible Elastomeric Spring" and filed concurrently herewith. It has been further discovered that such modified material is capable of repetitive absorption and dissipation of dynamic impact loads in the range between about 9,500 PSI and about 11,000 PSI without loss of structural integrity of the pad 110. The shape factor of the pad 110 is defined and limited by each of the current height of the standard American Association of Railroads (AAR) draft gear pocket of about 9.0 inches and by the travel of the draft gear assembly during cushioning of buff dynamic impact forces of about 3.25 inches.

Figure 1:
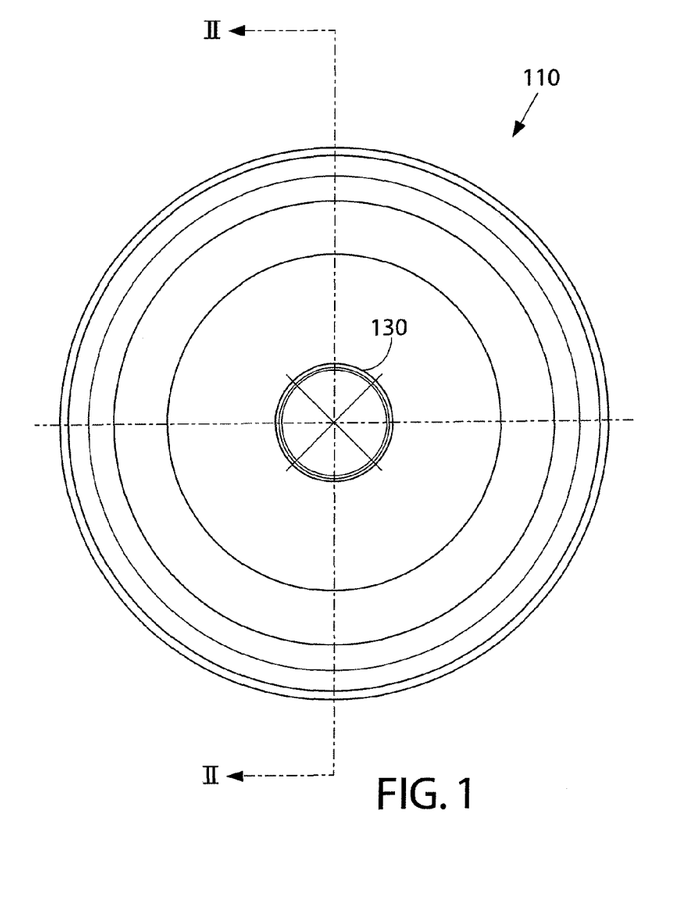
FIG. 1 is a planar view of a compressible elastomeric pad constructed in accordance with one embodiment of the present invention.
Figure 2:
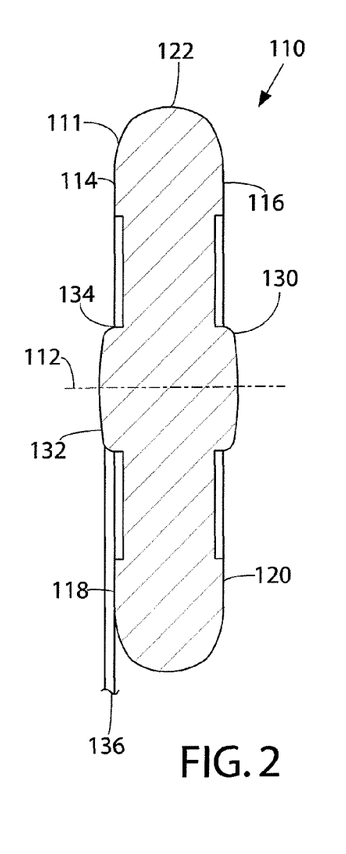
FIG. 2 is a cross-sectional elevation view of the pad of FIG. 1.
Figure 9:
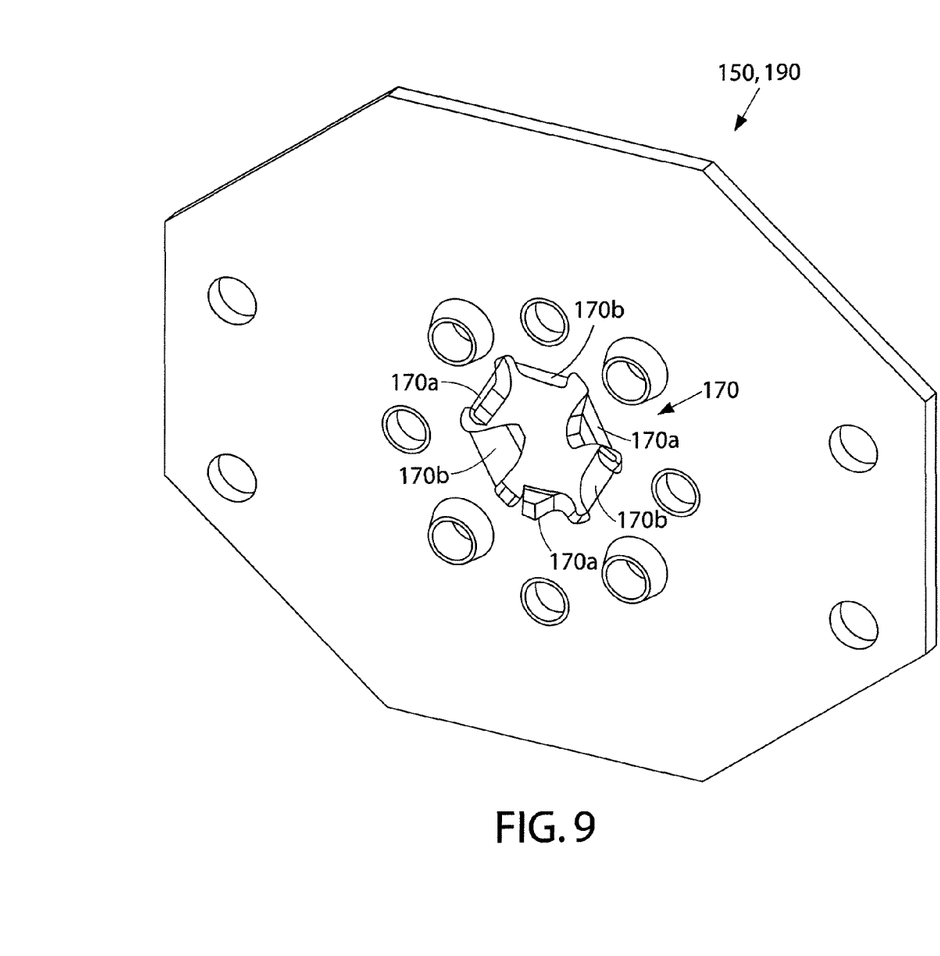
FIG. 9 is a perspective view of a plate employed in combination with the compressible elastomeric pad of FIGS. 1-8.

In accordance with another embodiment of the present invention, best shown in FIGS. 1-2, the pad 110 has a first projection 130 centrally formed on the first flat surface 118. The projection 130 has each of a predetermined height and a predetermined shape. A free end surface 132 of the projection 130 has a convex shape. As is well known, such projection 130 is employed for interlocking the pad 110 with the plate 150, 190. In the presently preferred form of FIGS. 1-2, the projection 130 has a circular cross-section normal to the central axis 112 and the diameter of the projection 130 is predetermined to provide frictional fit with the 170 (170a, 170b) of the plate 150, 190. The height 136 of the projection 130 extending beyond the flat surface 118 is determined based on the design of the abutting plate 150, 190. In the present invention and, further in view of the co-pending applications, the height 136 of the projection 130 is determined based on the thickness of the plate 150, 190 so as not to extend past the opposite edge of the plate 150 used as an end members of the spring 100, 102 or not to extend past the mid plane of the plate 190 used as a separator plate. An optional second projection 130 may be formed on the second flat surface 120 of the second axial end 116.

Figure 3:
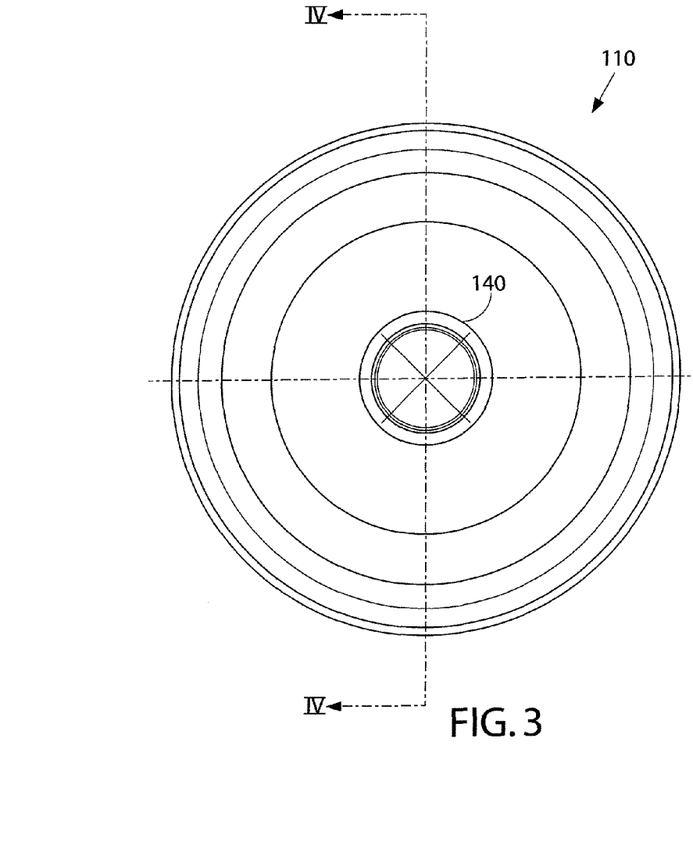
FIG. 3 is a planar view of a compressible elastomeric pad constructed in accordance with another embodiment of the present invention.
Figure 4:
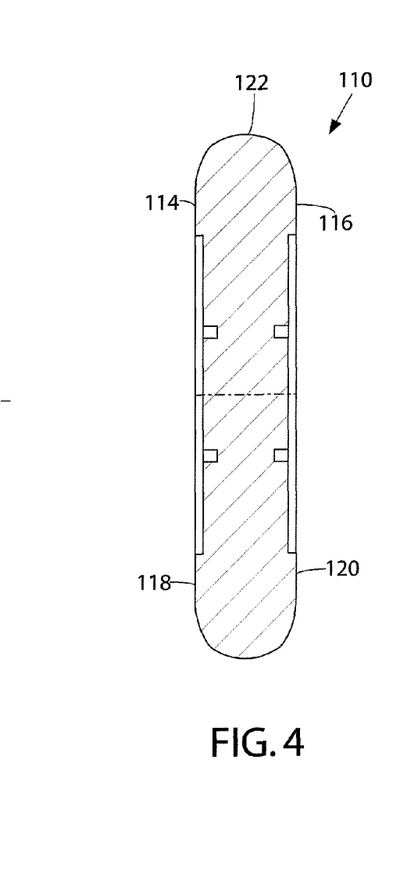
FIG. 4 is a cross-sectional elevation view of the pad of FIG. 3.

In accordance with another embodiment of the present invention, best shown in FIGS. 3-4, the pad 110 has at least one groove 140, formed in at least one of a respective flat surface 118, 120. The groove 140 has a predetermined shape. As has been disclosed in the co-pending U.S. Ser. No. 12/150,809 entitled "Compressible Elastomeric Spring", the groove 140 is employed for mating with the prongs 170 (170a, 170b) formed in the plate 150, 190. The width and depth of the groove 140 can be selected to interlock the pad 110 with the prongs 170 (170a, 170b) in either a frictional fit manner or in a slip fit manner. Any thermoplastic or thermoset material may be employed in manufacturing the pad 110 having the groove 140. In the presently preferred form of FIGS. 3-4, the predetermined material is at least one of a copolyester polymer and a copolyamide material.

Figure 5:
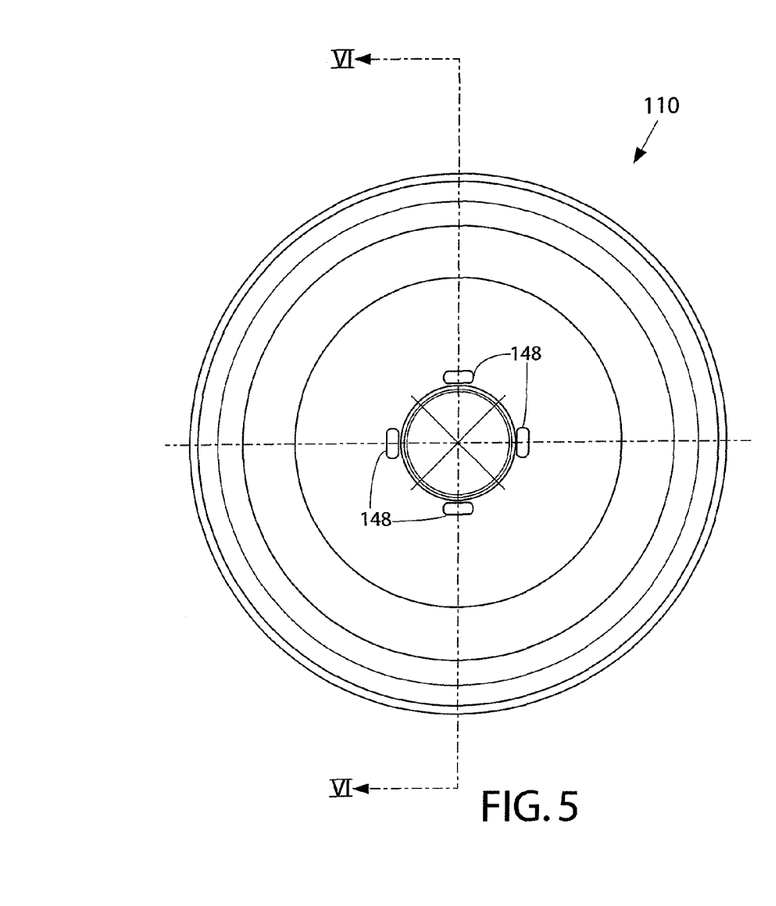
FIG. 5 is a planar view of a compressible elastomeric pad constructed in accordance with yet another embodiment of the present invention.
Figure 6:
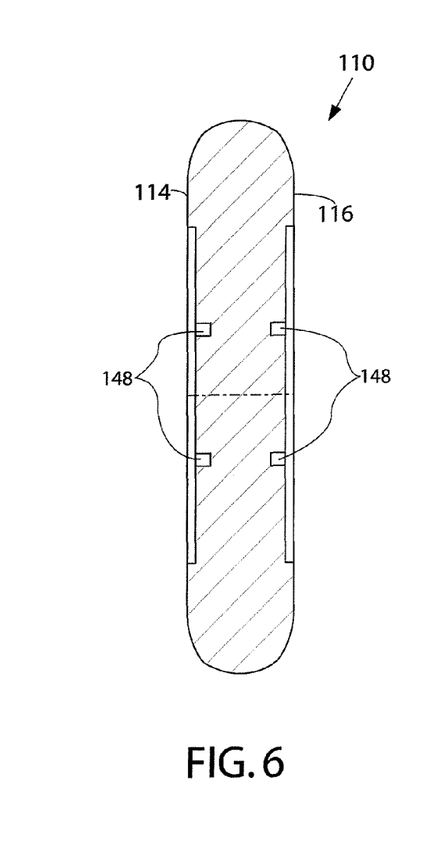
FIG. 6 is a cross-sectional elevation view of the pad of FIG. 5.
Figure 7:
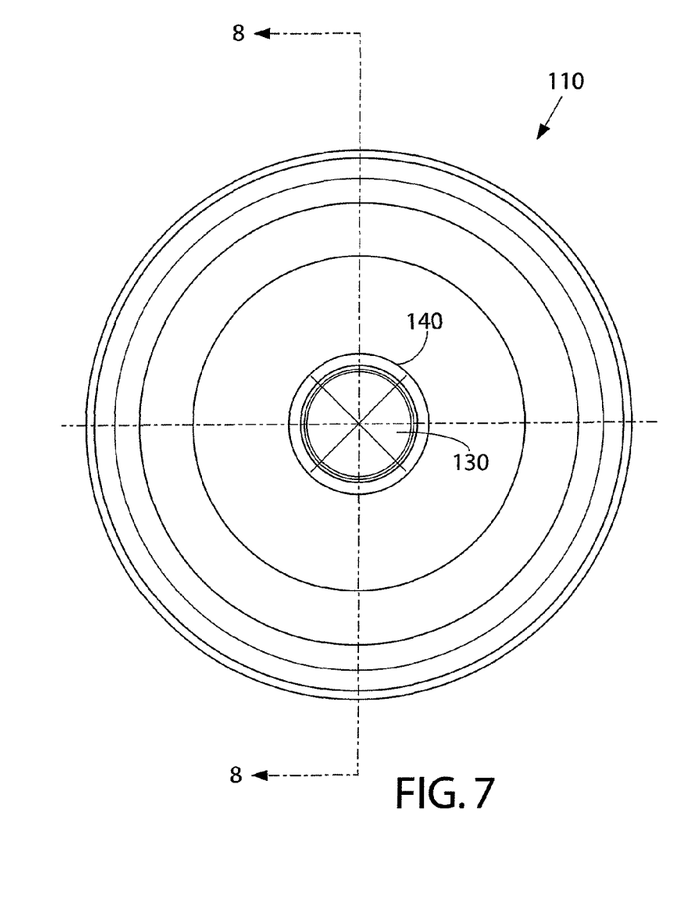
FIG. 7 is a planar view of a compressible elastomeric pad constructed in accordance with a presently preferred embodiment of the invention.
Figure 8:
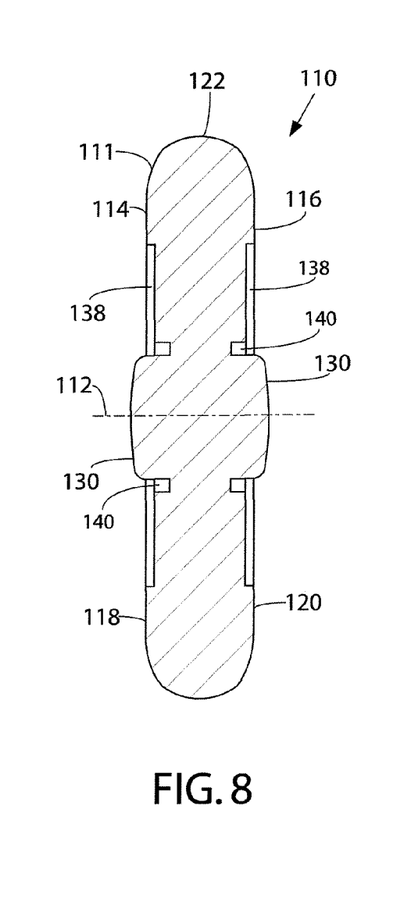
FIG. 8 is a cross-sectional elevation view of the pad of FIG. 7.

In accordance with yet another embodiment of the present invention, best shown in FIGS. 5-6, the groove 140 is replaced by a plurality of the pockets 148 each having a predetermined cross-section and a predetermined depth. In view of the co-pending applications, the pockets 148 are aligned with the prongs 170 (170a, 170b) and are sized for either a frictional fit or a slip fit engagement with such prongs. In the presently preferred form of FIGS. 5-6, the predetermined shape of the pocket 148 is generally identical to the shape of the prong 170 (170a, 170b). It has been contemplated that such pockets 148 may improve lateral stability of the spring 100, 102 and reduce the material shear levels.

The present invention contemplates that the pad 110 may have a projection 130 formed on one axial end and groove 140 or pockets 148 formed on the opposed axial end. In the most presently preferred embodiment of the invention of FIGS. 7-8, each axial end 114, 116 is provided with both projection 130 and groove 140 disposed in abutting relationship with a peripheral side surface 134 of the projection 130. It is further presently preferred for the volume of the groove 140 to be substantially identical to the volume of the projection 130 as to equalize and evenly distribute stresses caused during forming of the pad 110 over the entire flat surface 118, 120.

During forming, the preform 106 is compressed to a maximum travel height commonly known as a "solid height" height of the pad 110. During operation, as is conventionally known, the body 111 is compressed from its initial normal height to a height which is generally equal to or less than its solid height for cushioning and absorption of the dynamic impact load or energy applied to the pad 110. During compression, as the height of the body 111 decreases, the diameter of the peripheral surface 122 increases. When the dynamic impact force or energy is removed from the pad 110, the body 111 returns to its initial height and diameter.

The pad of FIGS. 1-8, may further have a recess 138 formed in each axial end 114, 116 during the forming process. The diameter of such recess 138 is generally equal to the diameter 106a of the preform 106.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. A compressible resilient elastomeric pad comprising:
   (a) a continuously solid body defining a central axis, said body formed from a predetermined material and having each of a peripheral side surface, a first axial end and a second axial end, each of said first and said second axial ends having a substantially flat surface thereof disposed normal to said central axis;
   (b) a first raised projection centrally formed on said substantially flat surface of said first axial end, said first projection having each of a predetermined height and a predetermined shape;
   (c) a second raised projection centrally formed on said substantially flat surface of said second axial end, said second projection having each of a predetermined height and a predetermined shape;
   (d) a first groove formed in said substantially flat surface of said first axial end in abutting relationship with a peripheral side surface of said first projection; and
   (e) a second groove formed in said substantially flat surface of said second axial end in abutting relationship with a peripheral side surface of said second projection.

2. The compressible elastomeric pad, according to claim 1, wherein said second projection is substantially identical to said first projection.

3. The compressible elastomeric pad, according to claim 1, wherein said second groove is substantially identical to said first groove.

4. The compressible elastomeric pad, according to claim 1 wherein a volume of each of said first and said second grooves is substantially equal to a volume of a respective one of said first and said second raised projections.

5. The compressible elastomeric pad, according to claim 1, wherein said pad is manufactured by a process of compressing a preform block having a generally round cross-section in a plane being traverse to a length thereof and wherein said pad further includes a recess formed in said substantially flat surfaces of each of said first and second axial ends in communication with said groove, said recess having a diameter thereof being generally equal to a diameter of said preform block.

6. A compressible resilient elastomeric pad comprising:
   (a) a continuously solid body defining a central axis, said body formed from a predetermined material and having each of a peripheral side surface, a first axial end and a second axial end, each of said first and said second axial ends having a flat surface thereof disposed normal to said central axis; and
   (b) a plurality of pockets formed in said flat surface of at least one of said first and said second axial ends.

7. In combination with a compressible elastomeric pad capable of absorbing and dissipating energy applied thereto, an improvement comprising said pad manufactured by a process of compressing a preform block and having a molecular structure thereof oriented during a said process and having a predetermined shape factor achieved during said process to enable repetitive absorption and dissipation of said energy in excess of about one hundred thirty percent (130%) of an ultimate tensile strength of said predetermined material.

8. A compressible resilient elastomeric pad comprising:
   (a) a continuously solid body defining a central axis of said pad, said body formed from a predetermined material and having each of a peripheral side surface, a first axial end and a second axial end, said peripheral side surface having an outwardly extending curved shape and each of said first and said second axial ends having a substantially flat surface thereof disposed normal to said central axis; and
   (b) a groove centrally formed in said flat surface of one of said first and second axial ends, said groove having a predetermined shape.

9. The compressible elastomeric pad, according to claim 8, wherein said continuously solid body has a circular cross-section disposed normal to said central axis.

10. The compressible elastomeric pad, according to claim 9, wherein each of said first and said second axial ends has a predetermined diameter.

11. The compressible elastomeric pad, according to claim 8, wherein said outwardly extending curved shape is formed during a forming process of said pad.

12. A compressible resilient elastomeric pad comprising:
(a) a continuously solid body defining a central axis of said pad, said body formed from a predetermined material and having each of a peripheral side surface, a first axial end and a second axial end, each of said first and said second axial ends having a substantially flat surface thereof disposed normal to said central axis;
(b) a groove centrally formed in said flat surface of one of said first and second axial ends, said groove having a predetermined shape; and
(c) a raised projection centrally formed on said flat surface of said one of said first and said second axial ends in abutting engagement with a peripheral inner surface of said groove, said projection having each of a predetermined height and a predetermined shape.

13. The compressible elastomeric pad, according to claim 12, wherein a free end surface of said projection has a convex shape.

14. The compressible elastomeric pad, according to claim 12, wherein said projection has a circular cross-section disposed normal to said central axis and wherein said groove has an annular shape.

15. The compressible elastomeric pad, according to claim 12, wherein a volume of said projection is substantially equal to a volume of said groove.

16. The compressible elastomeric pad, according to claim 12, wherein said peripheral side surface has an outwardly extending curved shape throughout at least middle portion of said peripheral side surface.

17. A compressible resilient elastomeric pad comprising:
(a) a continuously solid body defining a central axis of said pad, said body formed from a predetermined material and having each of a peripheral side surface, a first axial end and a second axial end, each of said first and said second axial ends having a substantially flat surface thereof disposed normal to said central axis;
(b) a groove centrally formed in said flat surface of one of said first and second axial ends, said groove having a predetermined shape; and
(c) a recess formed in said one of said first and second flat end surfaces in communication with said groove, said recess having each of a predetermined depth and a predetermined shape.

18. The compressible elastomeric pad, according to claim 17, wherein said pad is manufactured by a process of compressing a preform block having a generally round cross-section in a plane being traverse to a length thereof and wherein a diameter of said recess is generally equal to a diameter of said preform block.

19. A compressible resilient elastomeric pad comprising:
(a) a continuously solid body defining a central axis of said pad, said body formed from a predetermined material and having each of a peripheral side surface, a first axial end and a second axial end, each of said first and said second axial ends having a substantially flat surface thereof disposed normal to said central axis;
(b) a groove centrally formed in said flat surface of one of said first and second axial ends, said groove having a predetermined shape; and
(c) wherein said predetermined material is at least one of a copolyester polymer and a copolyamide material.

* * * * *